E. F. MORRIS & R. J. GREEN.

COMBINED HOE AND POTATO-DIGGER.

No. 7,157. Reissued June 6, 1876.

WITNESSES

T. Jones

A. White

INVENTOR

E. F. Morris. R. J. Green by J. J. Greenough

N. PETERS, PHOTO-LITHOGRAPHER, WASHINGTON, D. C.

UNITED STATES PATENT OFFICE.

E. F. MORRIS AND R. J. GREEN, OF CICERO, NEW YORK, ASSIGNORS, BY MESNE ASSIGNMENTS, TO TIMOTHY R. PORTER AND GEORGE A. PORTER.

IMPROVEMENT IN COMBINED HOES AND POTATO DIGGERS.

Specification forming part of Letters Patent No. 69,928, dated October 15, 1867; reissue No. 7,157, dated June 6, 1876; application filed April 18, 1876.

*To all whom it may concern:*

Be it known that we, E. F. MORRIS and R. J. GREEN, of Cicero, Onondaga county, New York, have invented a Combined Hoe and Potato-Digger, of which the following is a specification:

This invention consists in so constructing and combining certain devices that the implement can be readily made into a cultivating-hoe for weeding, hilling, &c., or converted, by a simple change, into a potato-digger, thus combining, in one agricultural implement, a capacity for several varied uses.

The following is a description of the parts and the several changes and uses, referring to the accompanying drawing, in which—

Figure 1:
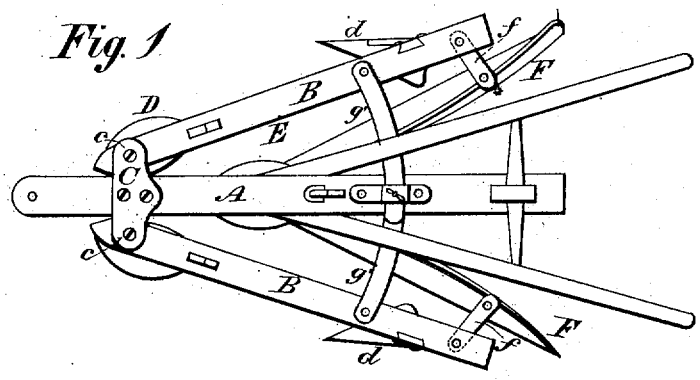
Figure 2:
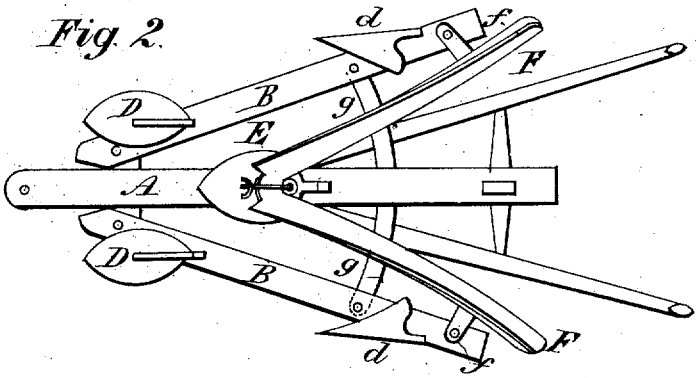
Figure 3:
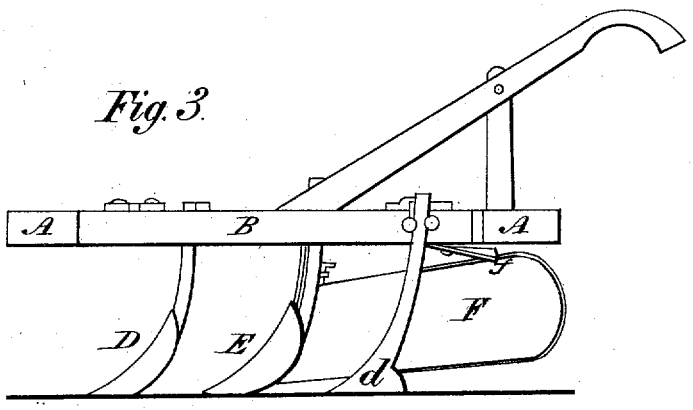

Figure 1 is a top plan of the implement. Fig. 2 is a plan of the same reversed. Fig. 3 is a side elevation.

A indicates the main beam, to which the animals are attached for draft. It runs straight through the center, and to it the handles are affixed, similar to ordinary cultivators. On each side of the main beam A, a side beam B, is hinged at its front end by a cross-head, C, and pivots *c c* or other convenient fixture, that will allow the rear ends of the two beams B to be expanded outward at an angle to the center beam, as desired. Each of the side beams B has a shovel-plow near its front end, and a small mold-board plow, *d*, near its rear end. To the main beam A, near the center of its length, a shovel-plow, E, is affixed, to which two wings or mold-boards, F F, are hinged, and project backward from said shovel E in an inclined position, and, being jointed thereto, their rear ends can be expanded outward at will. They can be connected by links *f* with the beams B, or be otherwise held at the proper angle. The rear ends of the wings and side beams are secured at the desired distance from the main beam by braces, as at *g g*, the said braces being secured to the center beam A in an adjustable manner by a pin or set-screw.

The arrangement and operation are as follows: For the first hoeing, the wings F F and center shovel E are removed. When the plants are grown up ready for a second hoeing, all the parts are attached, as seen in the drawing. The beams B, with shovels D D and shovel E attached, break up and loosen the ground. The small side plows *d d* cut up the grass and weeds near the drill, and throw them within reach of the wings or mold-boards F, by which they are covered with earth. Thus, after the leading plows D D and E break up and loosen the ground, the mold-boards in the rear clear up and cover over the weeds, depositing soft earth on each side around the plants. The width of the implement being variable more or less earth can be thrown up around the plants, as desired.

When it is used as a potato-digger, the beams B, front shovels D D, and plows *d d* can be removed, and the shovel E, with its wings F connected with the center beam A, is drawn through the center of the drill or hills, turning up the contents thereof, and throwing out the potatoes, ready for gathering, on each side of the furrow.

Having thus fully described our invention in combined hoe and potato-digger, we claim—

The expanding side beams B, bearing the plows D *d*, and the expanding wings F, jointed to the shovel-plow E, in combination with the main beam A, constructed, arranged, and operating substantially as herein shown, and for the purposes described.

E. F. MORRIS.
R. J. GREEN.

Witnesses for E. F. MORRIS:
J. J. BENTLEY,
W. LARRABEE.

Witnesses for R. J. GREEN:
B. S. STONE,
E. T. STONE.